(12) United States Patent
Cypher et al.

(10) Patent No.: US 7,730,265 B1
(45) Date of Patent: Jun. 1, 2010

(54) STARVATION-AVOIDING UNBOUNDED TRANSACTIONAL MEMORY

(75) Inventors: Robert E. Cypher, Saratoga, CA (US); Shailender Chaudhry, San Francisco, CA (US)

(73) Assignee: Oracle America, Inc., Redwood Shores, CA (US)

(*) Notice: Subject to any disclaimer, the term of this patent is extended or adjusted under 35 U.S.C. 154(b) by 585 days.

(21) Appl. No.: 11/715,243

(22) Filed: Mar. 6, 2007

(51) Int. Cl.
*G06F 12/00* (2006.01)

(52) U.S. Cl. .................. 711/141; 711/146; 711/150; 711/151; 711/152; 710/200

(58) Field of Classification Search .............. 711/141, 711/146, 150–152, 163, E12.032, E12.039, 711/E12.05; 710/100, 200
See application file for complete search history.

(56) References Cited

U.S. PATENT DOCUMENTS 6,928,525 B1 * 8/2005 Ebner et al. ............. 711/150
7,269,693 B2 * 9/2007 Tremblay et al. .......... 711/141
7,269,694 B2 * 9/2007 Tremblay et al. .......... 711/141

* cited by examiner

*Primary Examiner*—Jasmine Song
(74) *Attorney, Agent, or Firm*—Park, Vaughan & Fleming LLP; Anthony P. Jones

(57) ABSTRACT

One embodiment of the present invention provides a system that facilitates efficient transactional execution. During operation, the system executes a starvation-avoiding transaction for a thread, wherein executing the starvation-avoiding transaction involves: (1) placing load-marks on cache lines which are loaded during the starvation-avoiding transaction; (2) placing store-marks on cache lines which are stored to during the starvation-avoiding transaction; and (3) writing a timestamp value into metadata for load-marked and store-marked cache lines. While the thread is executing the starvation-avoiding transaction, the system prevents other threads from executing another starvation-avoiding transaction. Whereby the load-marks and store-marks prevent interfering accesses from other threads to the cache lines during the starvation-avoiding transaction.

21 Claims, 16 Drawing Sheets

STARVATION-AVOIDING UNBOUNDED TRANSACTIONAL MEMORY

BACKGROUND

1. Field of the Invention

The present invention relates to the design of computer systems. More specifically, the present invention relates to a technique that facilitates starvation-avoiding unbounded transactions in a transactional memory system.

2. Related Art

Transactional memory is a promising programming abstraction that helps programmers write correct parallel programs and helps compilers automatically parallelize sequential threads. Unfortunately, existing transactional memory systems suffer from limitations on the size of transactions that they can support. This limitation occurs because transactional memory systems use structures which are bounded in size to keep track of information which grows proportionately to transaction size. For example, in a typical transactional memory system, the processor buffers transactional store operations in a store queue. However, if the transaction is a large transaction which generates a large number of stores, the store queue will overflow and the processor must abort the transaction.

In order to alleviate this problem, processor designers have suggested different techniques to provide both hardware-based and hybrid hardware-software-based support for "unbounded" transactions. For example, the UTM transactional memory protocol proposed by Ananian et al. (see C. S. Ananian, K. Asanovi'c, B. Kuszmaul, C. Leiserson, and S. Lie, *Unbounded Transactional Memory*, Proceedings of the 11th International Symposium on High-Performance Computer Architecture (HPCA '05), 2005), and the TCC protocol proposed by Hammond et al. (see L. Hammond, V. Wong, M. Chen, B. Carlstrom, J. Davis, B. Hertzberg, M. Prabhu, H. Wijaya, C. Kozyrakis, and K. Olukotun, *Transactional Memory Coherence and Consistency*, ISCA p. 102, 31st Annual International Symposium on Computer Architecture (ISCA '04), 2004), are both hardware-based techniques that support starvation-avoiding, unbounded transactions. Unfortunately, UTM requires very complex hardware which buffers all data overwritten by transactions in memory and automatically searches through linked lists in memory to determine the value to return for loads. Moreover, TCC requires very high bandwidth, because all data stored during each transaction must be broadcast to all other processors. Furthermore, TCC requires that all other processors stop accessing memory whenever a large, starvation-avoiding transaction is being processed.

The Hybrid protocol proposed by Moir et al. (see M. Moir, P. Damron, A. Fedorova, Y. Lev, V. Luchangco, and D. Nussbaum, *Hybrid Transactional Memory*, Proceedings of the 12th International Conference on Architectural Support for Programming Languages and Operating Systems, (San Jose 2006)), and the Log™ protocol proposed by Moore et al. (see K. Moore, J. Bobba, M. Moravan, M. Hill & D. Wood, *Log™: Log-based Transactional Memory*, 12th Annual International Symposium on High Performance Computer Architecture (HPCA-12), 2006), are hybrid hardware-software-based techniques that use hardware for certain transactions but fall back on software for other transactions. More specifically, the Hybrid protocol uses software to run transactions that cannot be completed in hardware (due, for example, to resource constraints), and thus implements a software transactional memory protocol which involves buffering store data in separate data structures until the transaction commits. In contrast, the Log™ protocol requires hardware support to copy old values of certain memory locations that are written within a transaction, and it requires software support to traverse data structures and restore old values of cache lines that were written by transactions that abort. The use of software to implement all or part of the transactional memory system can seriously degrade the performance of the transactional memory system. Furthermore, the hardware support required for Log™ is complex and difficult to implement.

Hence, what is needed is a processor that can execute unbounded transactions without the problems of the above-described transactional memory systems.

SUMMARY

Embodiments of the present invention provide a system that facilitates efficient transactional execution for large transactions. During operation, the system executes a starvation-avoiding transaction for a thread, wherein executing the starvation-avoiding transaction involves: (1) placing load-marks on cache lines which are loaded during the starvation-avoiding transaction; (2) placing store-marks on cache lines which are stored to during the starvation-avoiding transaction; and (3) writing a timestamp value into metadata for load-marked and store-marked cache lines. These load-marks and store-marks prevent interfering accesses from other threads to the cache lines during the starvation-avoiding transaction. Furthermore, while the thread is executing the starvation-avoiding transaction, the system prevents other threads from executing another starvation-avoiding transaction.

In some embodiments, the system obtains a token before commencing execution of the starvation-avoiding transaction and releases the token when the starvation-avoiding transaction completes.

In some embodiments, wherein when a cache line is load-marked, no other thread may store a value in the cache line and when a cache line is store-marked, no other thread may load or store a value in the cache line.

In some embodiments, the system executes at least one non-starvation-avoiding transaction for another thread while executing the starvation-avoiding transaction. When executing the non-starvation-avoiding transaction the system: (1) places load-marks on cache lines which are loaded during the non-starvation-avoiding transaction; (2) places store-marks on cache lines which are stored to during the non-starvation-avoiding transaction; and (3) stores the addresses of load-marked or store-marked cache lines in a private buffer corresponding to the other thread.

In some embodiments, if a load-mark or store-mark placed during a non-starvation-avoiding transaction is encountered on a cache line read from or written to during the starvation-avoiding transaction, the system aborts the non-starvation-avoiding transaction, wherein aborting the non-starvation-avoiding transaction involves using the addresses stored in the private buffer for the corresponding thread to identify cache lines load-marked or store-marked during the non-starvation-avoiding transaction and releasing the load-mark or store-mark from identified cache lines. The system then places a load-mark or store-mark associated with the starvation-avoiding transaction on the cache line and writes a timestamp value into metadata for the cache line. Next, the system continues the starvation-avoiding transaction.

In some embodiments, if a load-mark or store-mark placed during a non-starvation-avoiding transaction is encountered on a cache line read from or written to during the starvation-avoiding transaction, the system sets an SA-requested flag for the cache line, wherein when the SA-requested flag is set, no other thread can place a subsequent load-mark or store-mark on the cache line. The system then delays the starvation-avoiding transaction. The system resumes executing the starvation-avoiding transaction when the marking thread has cleared the load-mark or store-mark from the cache line. Note that when resuming the starvation-avoiding transaction, the system clears the SA-requested flag and places the SA load- or store-mark on the cache line.

In some embodiments, the system performs IO accesses during the starvation-avoiding transaction as corresponding IO access instructions are executed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
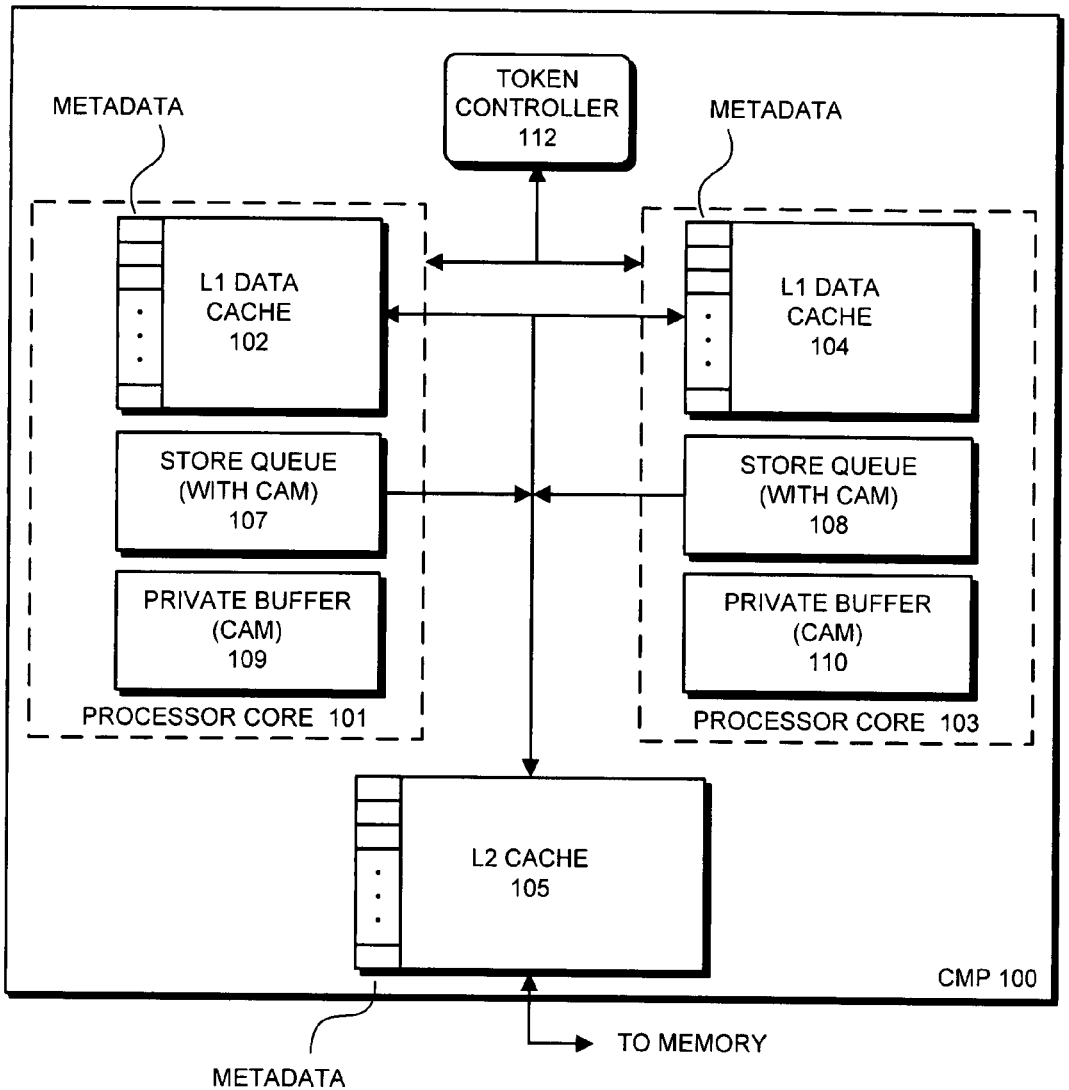
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 include private buffers 109 and 110, which maintain copies of addresses of load-marked and store-marked cache lines to facilitate efficient lookups of theses addresses. When a thread needs to load from or store to a cache line, that thread first checks its private buffer to determine if the thread has already load-marked or store-marked the cache line.

In addition, CMP system 100 includes token controller 112. Token controller 112 controls the distribution of a single "token" among the processor cores in CMP 100. Because only one starvation-avoiding transaction is allowed to execute at a time, token controller 112 ensures that only one processor (or thread) has a token at any given time. Note that when a processor obtains the token, the token is delivered from token controller 112 to the processor along with a timestamp that is incremented each time a token is granted.

In addition, to support transactional memory, cache lines contained in L1 data caches 102 and 104, L2 cache 105, and in the memory (not shown) include metadata. This metadata can include a load-mark, a store-mark, a starvation-avoiding load-mark, a starvation-avoiding store-mark, a timestamp, a reader count, and an SA-requested flag (i.e., a starvation-avoiding transaction requested flag).

A thread (or a processor) can place a load-mark or a store-mark on a cache line by asserting the corresponding load- or store-mark in the metadata for the cache line. When a cache line is load-marked by a thread, no other threads are permitted to store to the cache line, thereby preventing another thread from overwriting a value in the cache line. On the other hand, when a cache line is store-marked by a thread, the store-mark prevents another thread from loading the value from or storing a value to the cache line, thereby providing the store-marking thread with exclusive access to the cache line. We refer to the process of placing such marks on a cache line as either "load-marking" or "store-marking" the cache line.

A thread (or processor) can place a starvation-avoiding load-mark or store-mark on a cache line while the thread is executing a starvation-avoiding transaction by asserting the corresponding starvation-avoiding load-mark or starvation-avoiding store-mark in the metadata for the cache line. When a cache line has the starvation-avoiding load-mark asserted, if the marking thread is still executing the starvation-avoiding transaction, no other thread is permitted to store to the cache line. On the other hand, when a cache line has the starvation-avoiding store-mark asserted, if the marking thread is still executing the starvation-avoiding transaction, no other thread is permitted to load from or store to the cache line, thereby providing the marking thread with exclusive access to the cache line during the transaction. Note that when a thread asserts a starvation-avoiding load-mark or a starvation-avoiding store-mark on a cache line, the thread also writes the value of the timestamp (i.e., the timestamp delivered by token controller 112) in the metadata for the cache line.

Before a starvation-avoiding thread asserts a starvation-avoiding load-mark or a starvation-avoiding store-mark on a cache line, the thread determines if there is an existing load-mark or store-mark on the cache line. If so, another thread has marked the cache line. In one embodiment of the present invention, this other thread is made to fail its transaction. In another embodiment, the other thread that placed the load- or store-mark continues its transaction and the thread that is executing the starvation-avoiding transaction asserts the SA-requested flag in the metadata for the cache line and delays its access to the cache line. When the SA-requested flag is asserted, no other thread can place a load- or store-mark on the cache line. Consequently, when the prior load- or store-marking thread clears its load- or store-mark from the cache line, the thread that is executing the starvation-avoiding transaction can: clear the SA-requested flag; place a starvation-avoiding load-mark or store-mark on the cache line; and can proceed with the starvation-avoiding transaction.

A load-mark prevents any other thread from writing to the cache line but not from reading from the cache line, so multiple threads can place load-marks on a cache line (i.e., multiple threads can be reading from the cache line simultaneously). Hence, in one embodiment of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks (i.e., the reader count value is zero).

In addition, when a thread has placed a load-mark or a starvation-avoiding load-mark on a cache line, the thread can perform any number of loads from the cache line. In other words, as long as a load-mark is set on the cache line, the marking thread may freely load the value from the cache line.

The store- and starvation-avoiding store-marks functions in the same way for stores to the cache line.

Load-Marking

The Load-Mark Request Operation

Figure 2A:
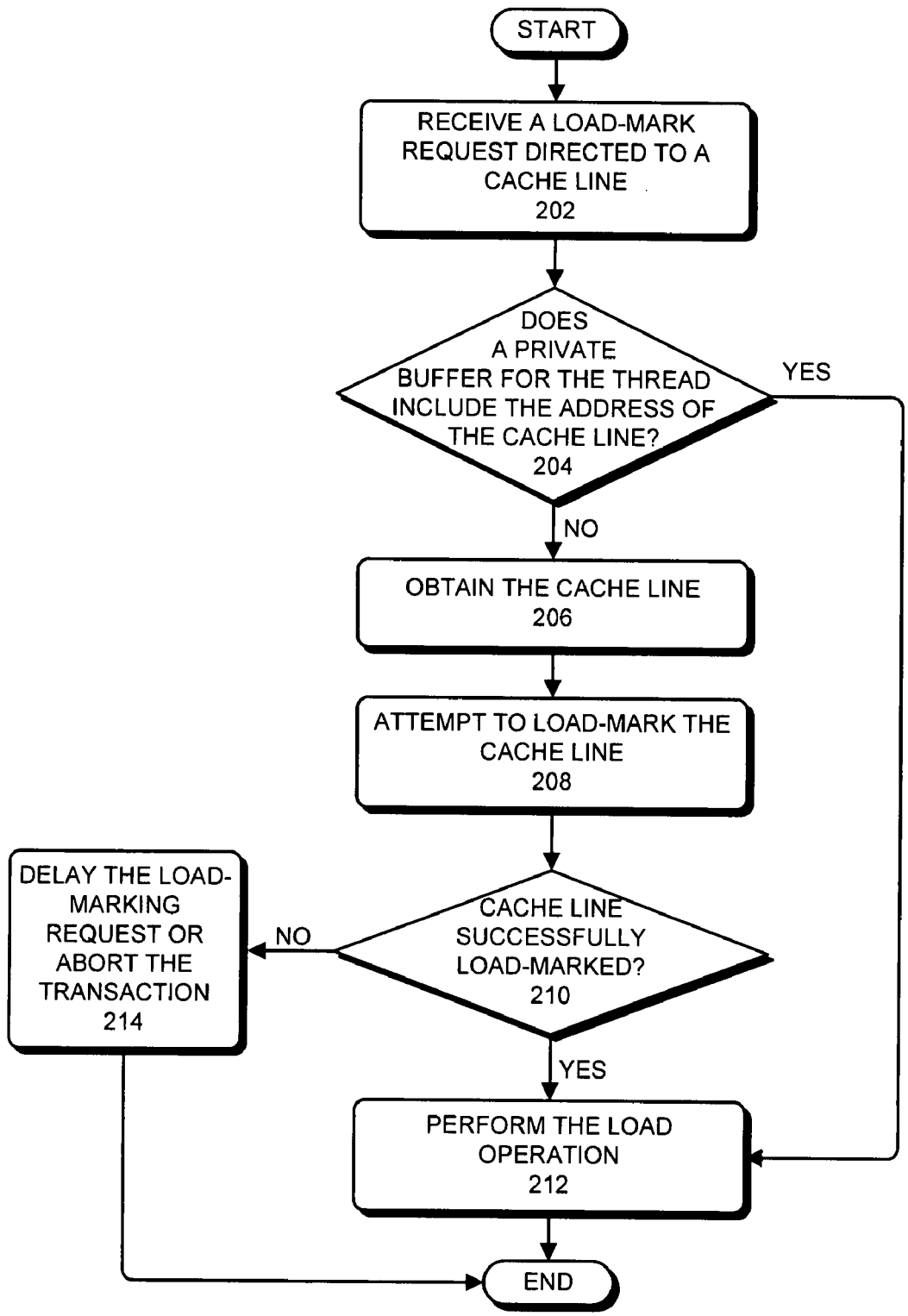
FIG. 2A presents a flowchart illustrating the process of performing a load-mark request operation in accordance with an embodiment of the present invention.

FIG. 2A presents a flowchart illustrating the process of performing a load-mark request operation in accordance with an embodiment of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 212).

If the private buffer does not contain the corresponding address, the thread has not yet load-marked the cache line. In this case, the system then obtains the cache line (step 206) and attempts to load-mark the copy of the cache line in the local cache (step 208).

If load-marking is successful (step 210), the system performs the load operation (step 212). Otherwise, if the load-marking is unsuccessful, the system retries the load-mark request after a delay. In one embodiment of the present invention, the load-mark request is retried a predetermined number of times, and if the load-mark request remains unsuccessful, the transaction is aborted (step 214).

Figure 2B:
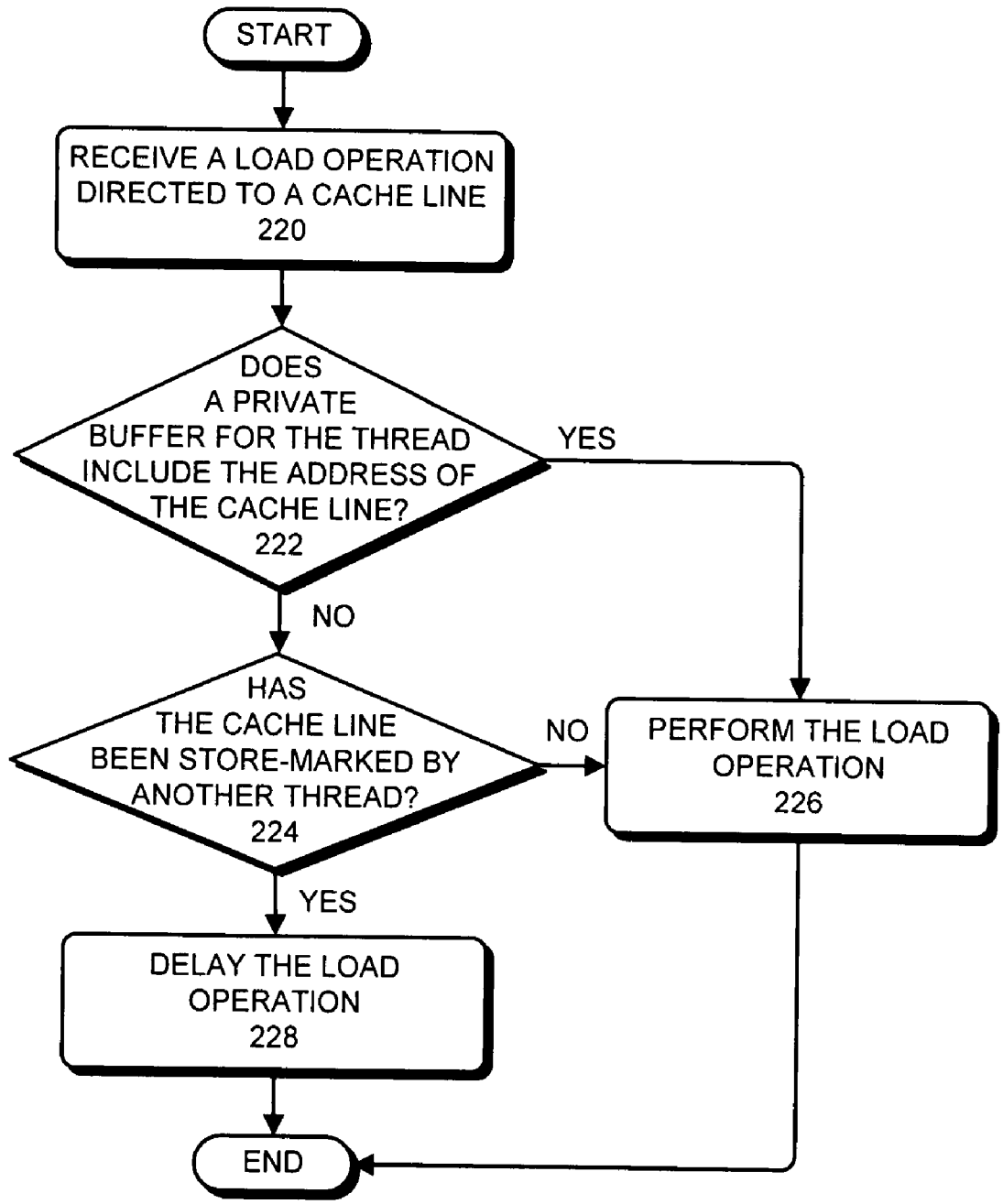
FIG. 2B presents a flowchart illustrating the process of performing a load operation without load-marking the cache line in accordance with an embodiment of the present invention.

FIG. 2B presents a flowchart illustrating the process of performing a load operation without load-marking the cache line in accordance with an embodiment of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
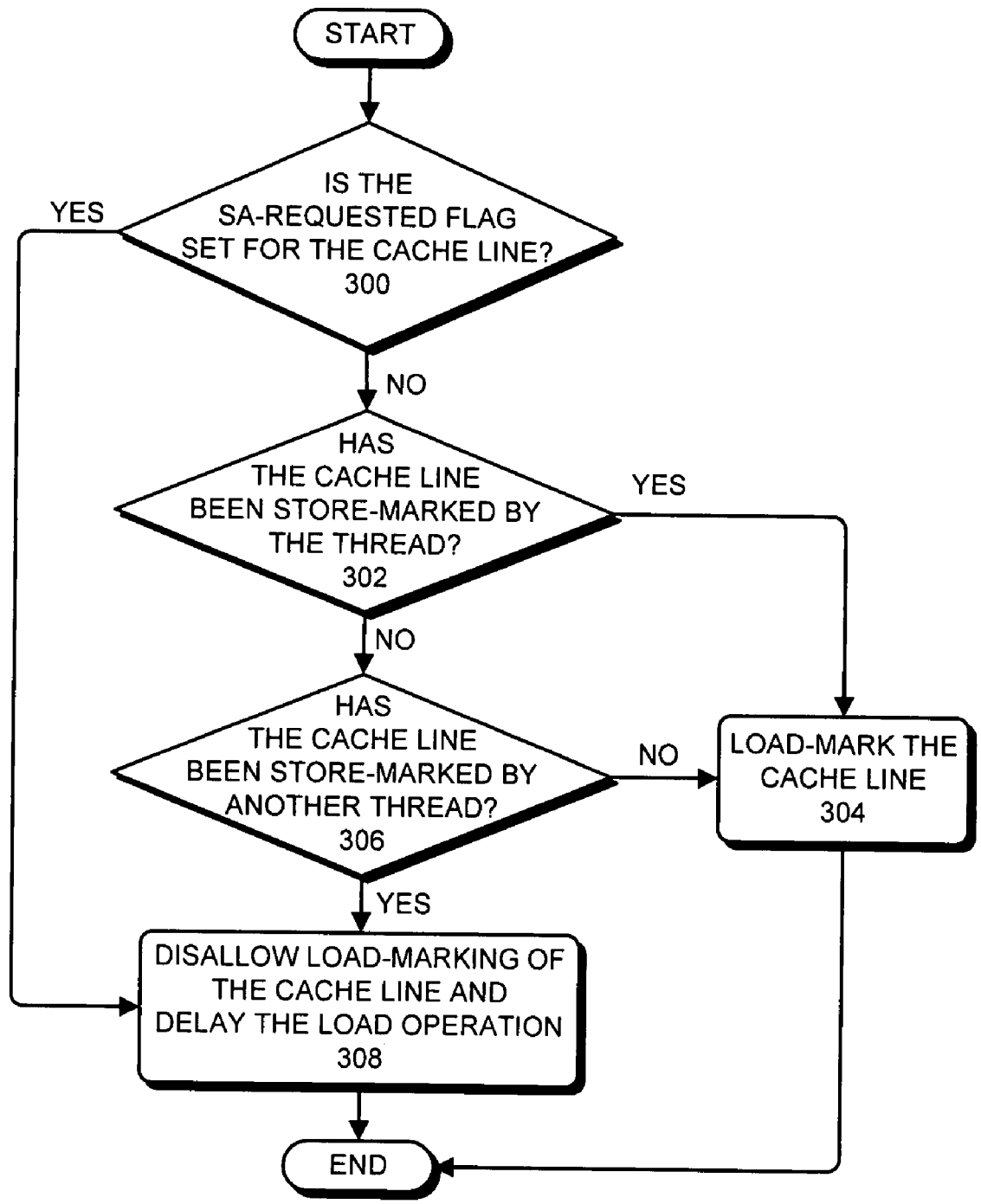
FIG. 3 presents a flowchart illustrating the process of attempting to load-mark the cache line in accordance with an embodiment of the present invention.

FIG. 3 presents a flowchart illustrating the process of attempting to load-mark the cache line in accordance with an embodiment of the present invention. During this process, the system first determines whether the SA-requested flag is asserted for the cache line (step 300). If so, another thread (or processor) has requested to execute a starvation-avoiding transaction, and no load-marks may be placed on the cache line. Hence, the thread delays the load operation (step 308).

Otherwise, the system determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
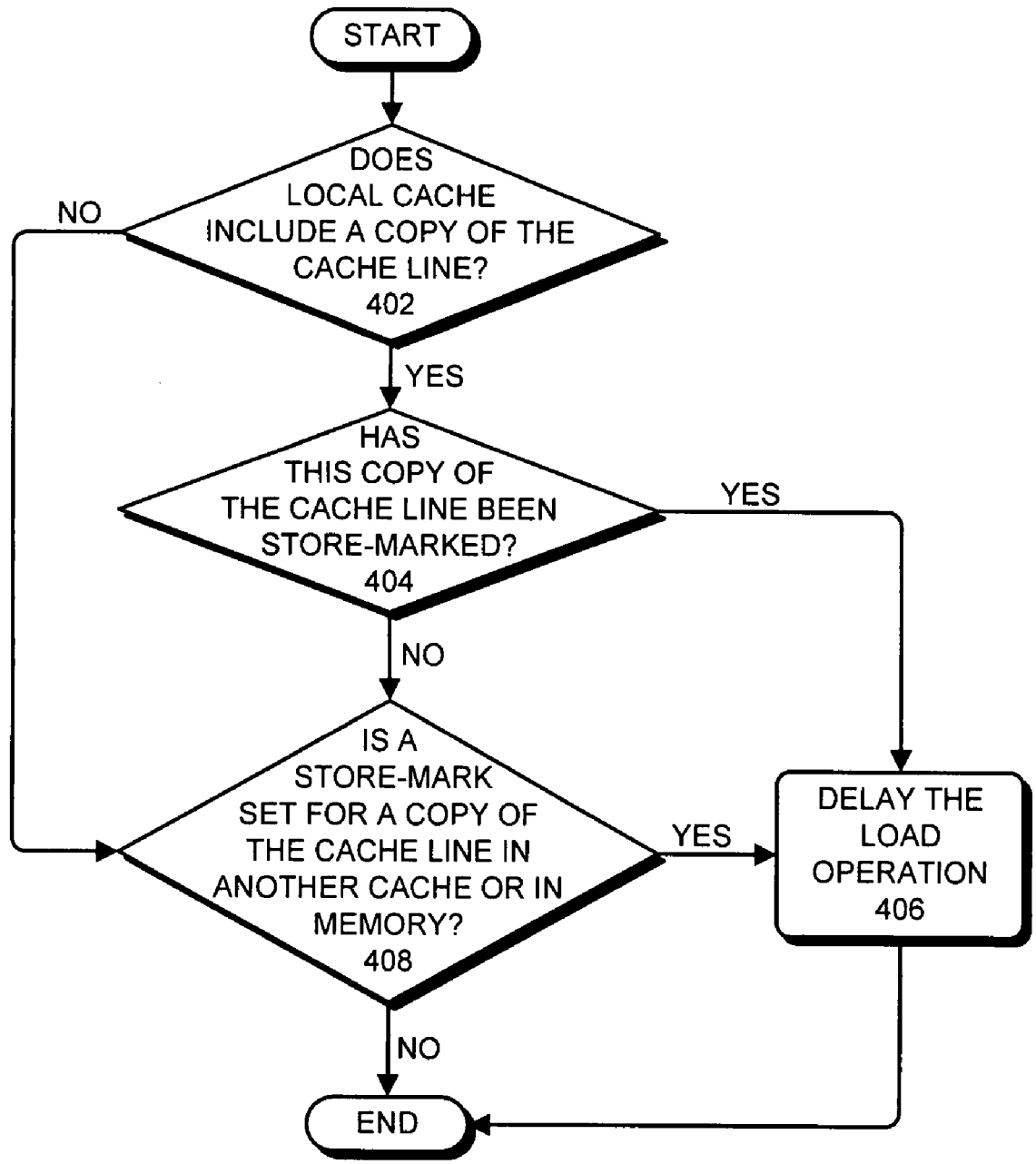
FIG. 4 presents a flowchart illustrating the process of determining whether the cache line has been store-marked by another thread in accordance with an embodiment of the present invention.

FIG. 4 presents a flowchart illustrating the process of determining whether the cache line has been store-marked by another thread in accordance with an embodiment of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, which means the cache line cannot be load-marked, and the load operation is delayed (step 406).

Store-Marking

The Store-Marking Operation

Figure 5A:
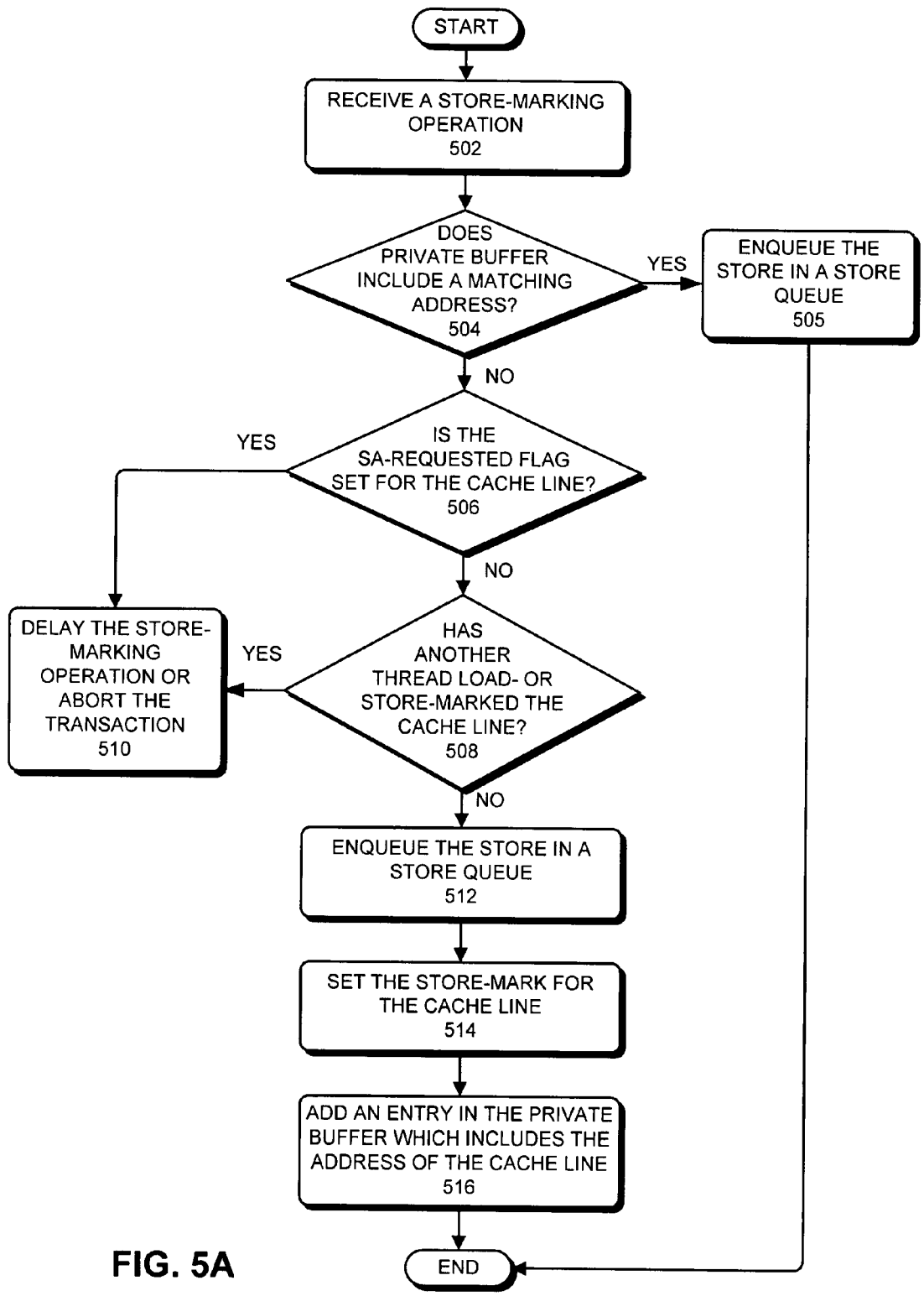
FIG. 5A presents a flowchart illustrating the process of performing a store-marking operation in accordance with an embodiment of the present invention.

FIG. 5A presents a flowchart illustrating the process of performing a store-marking operation in accordance with an embodiment of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread enqueues the store in a store-queue (step 505) and the store-marking operation ends.

If the private buffer does not contain a matching address, the thread concludes that it has not set the store-mark. In this case, the thread determines whether the SA-requested flag is asserted for the cache line (step 506). If so, another thread has requested to execute a starvation-avoiding transaction, and no store-marks may be placed on the cache line. Hence, the thread delays the store-marking operation (step 510). In one embodiment of the present invention, the store-marking operation is retried a predetermined number of times, and if the store-marking operation continues to be unsuccessful, the transaction is aborted (step 510).

The thread then determines whether the cache line has been store-marked or load-marked by another thread (step 508). During this process, system first checks in the thread's local cache for a copy of the cache line. If the system finds a copy of the cache line, the system examines the load-mark and store-mark to determine whether the cache line has been load-marked or store-marked by another thread. If the store-mark in the copy of the cache line is not set, the system determines whether the store-mark has been set in another copy of the cache line which exists in another cache or in memory. If a store-mark is set in either location, the store-marking operation is delayed and retried (step 510). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store-marking operation is delayed and retried (step 510). In one embodiment of the present invention, the store-marking operation is retried a predetermined number of times, and if the store-marking operation continues to be unsuccessful, the transaction is aborted (step 510).

Note that the system can use a cache-coherence mechanism to determine whether another cache or the memory holds a store-marked or load-marked copy of the cache line. This can involve sending an exclusive access request for the cache line to the other caches. If successful, the exclusive access request returns the cache line including store-mark status and the load-mark reader count. In one embodiment of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line provided no other thread has load-marked the cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if the cache line is in the E state, it may be necessary to change the cache line to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark or load-mark is not set in another cache or in memory, the system enqueues the store operation in store queue 107 (step 512). The system then sets the store-mark for the cache line (step 514) and adds the address of the cache line to the private buffer (step 516). Note that this entry remains in the private buffer until subsequent changes are made to the state of the cache line, such as removing the store-mark.

In one embodiment of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In one embodiment of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
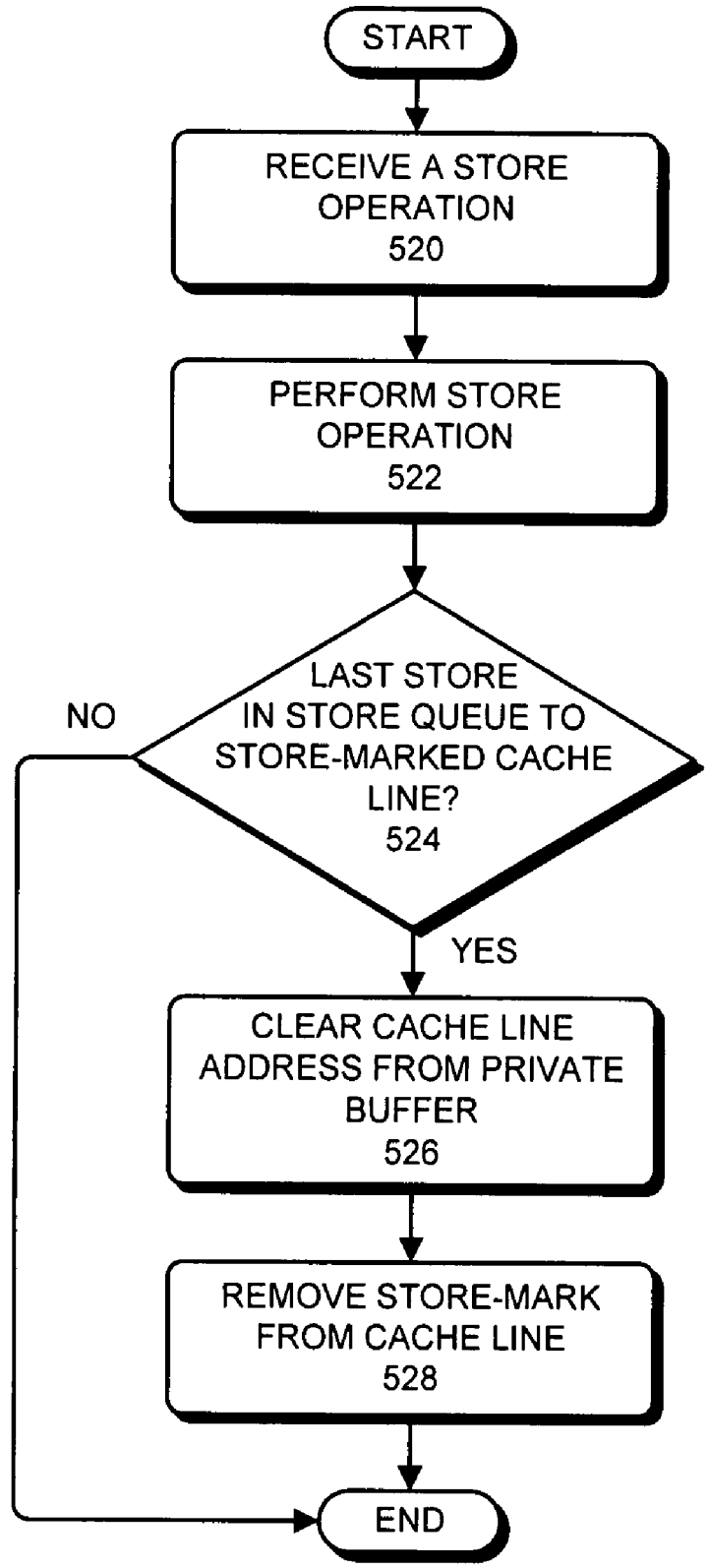
FIG. 5B presents a flowchart illustrating the process of performing a store operation for a cache line that has been store-marked in accordance with an embodiment of the present invention.

FIG. 5B presents a flowchart illustrating the process of performing a store operation for a cache line that has been store-marked in accordance with an embodiment of the present invention. The system first receives a store operation for a thread which is directed to a cache line from the store queue (step 520) and performs the store operation (step 522).

The system then determines if the store operation was the last store operation in the store queue to a store-marked cache line (step 524). If the store operation was the last store operation, the system clears the address of the store-marked cache line from the private buffer (step 526) and removes the store-mark from the cache line (step 528).

Figure 5C:
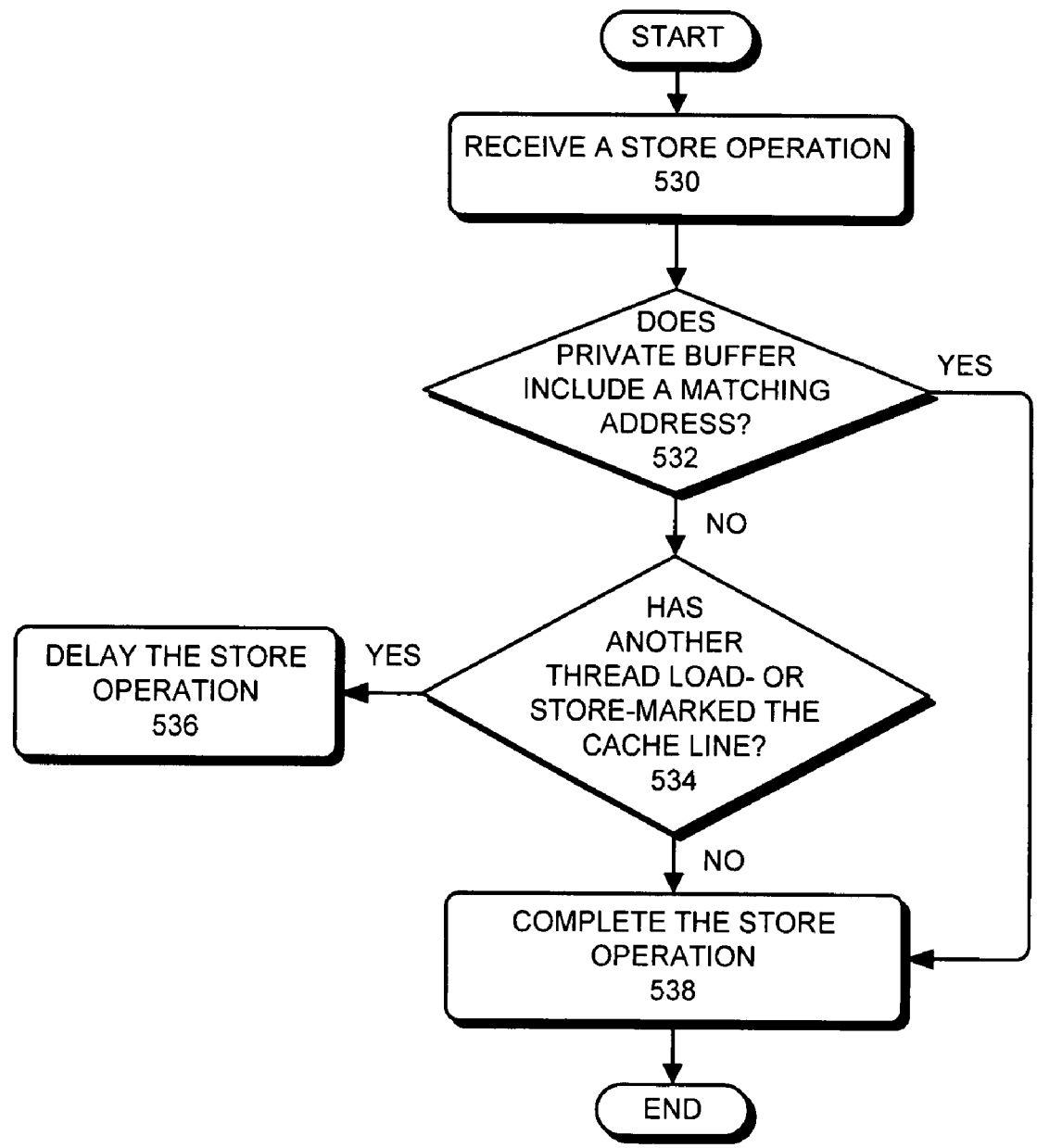
FIG. 5C presents a flowchart illustrating the process of performing a store operation for a cache line that has not been store-marked in accordance with an embodiment of the present invention.

FIG. 5C presents a flowchart illustrating the process of performing a store operation for a cache line that has not been store-marked in accordance with an embodiment of the present invention. The system first receives a store operation for a thread from the store queue which is directed to a cache line (step 530). For the purposes of illustration, we assume that the store operation was the oldest store operation in the store queue and that the store operation has not been reordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In one embodiment of the present invention, the system eventually propagates the load-marks and store-marks in the metadata for a cache line to the other caches and to memory. The following sections explain the process of propagating the load-marks and store-marks. Note that we refer to the combination of load-marks and store-marks together as "metadata" for cases where load-marks and store-marks are propagated in a similar way. Note further that the following section describes the propagation of non-starvation-avoiding load-marks and store-marks.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, mark the cache line before performing a read or write to the cache line.

Figure 6A:
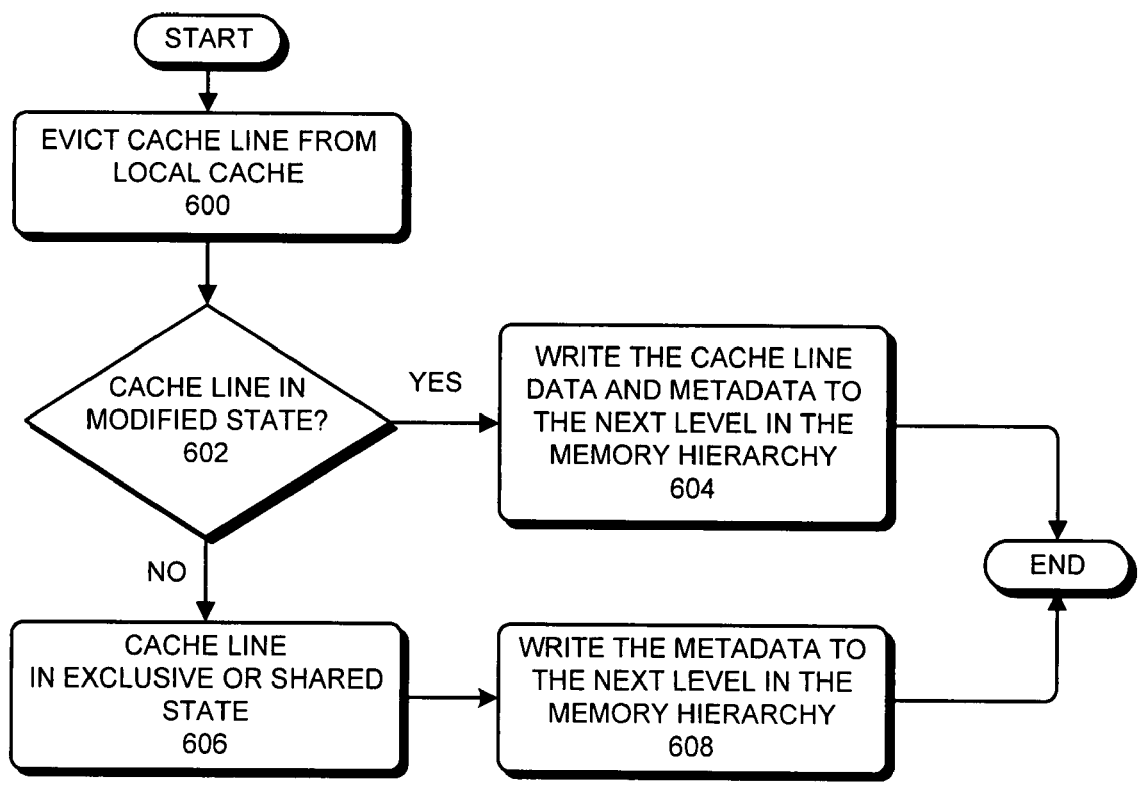
FIG. 6A presents a flowchart illustrating the process of propagating load-mark metadata for an evicted cache line in accordance with an embodiment of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
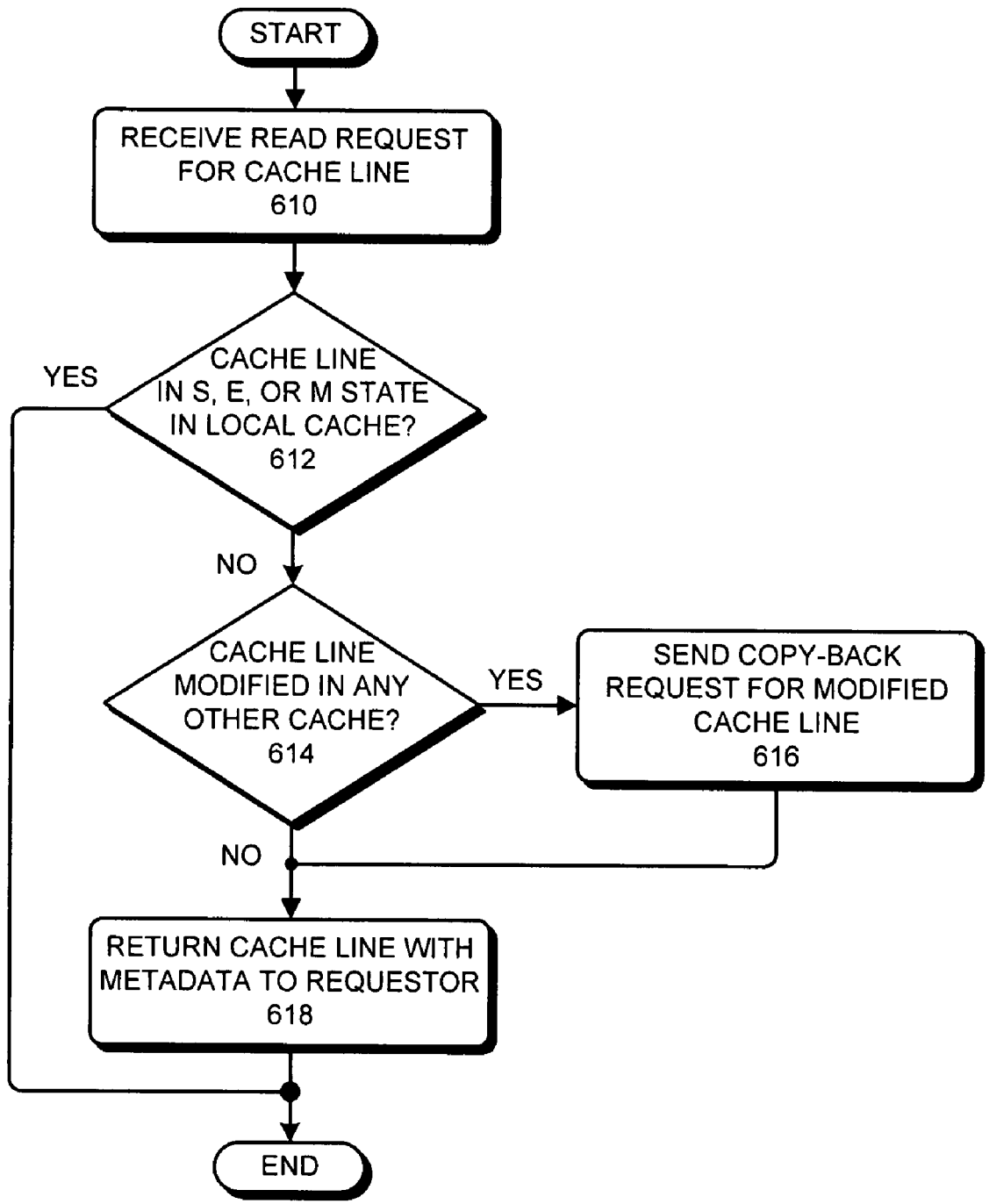
FIG. 6B presents a flowchart illustrating the process of propagating load-mark metadata for a cache line during a read operation in accordance with an embodiment of the present invention.

We next consider the case where the cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requestor (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
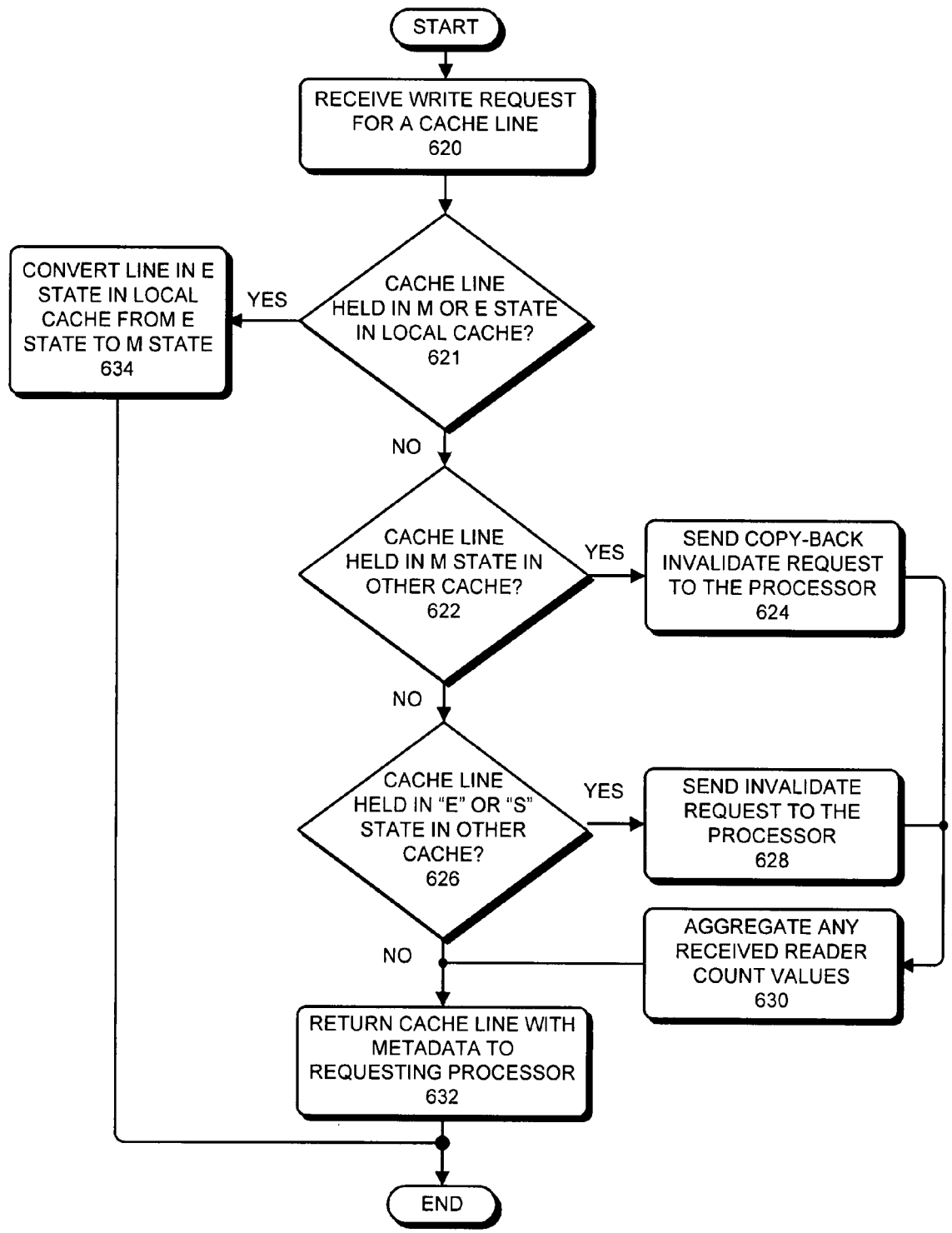
FIG. 6C presents a flowchart illustrating the process of propagating load-mark metadata for a cache line during a write operation in accordance with an embodiment of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for one embodiment of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so no special treatment is required for the store-mark in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to memory and the local copy of the cache line in the given cache is invalidated.

In addition, the system determines the number of load-marks that are on the copy of the cache line in memory. In one embodiment of the current invention, the system makes the determination by reading the metadata of the cache line in memory.

The system then sums load-marks in the metadata received from the other caches and from memory (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Non-Starvation-Avoiding Transactions

Embodiments of the present invention implement non-starvation-avoiding transactions (alternatively called "transactions") by maintaining a transaction state (including a "not-in-transaction" state and a "transaction-pending" state) for each thread and by buffering data from stores which occur during the transaction in the store queue. The system then either commits the transaction by performing the associated stores, or aborts the transaction by removing the associated stores from the store queue and restoring the pre-transactional state of the thread from a checkpoint generated at the start of the transaction.

The preceding sections of this disclosure describe how load-marks and store-marks can be placed on cache lines to allow an arbitrary number of reads and writes to be performed to those cache lines. The reads and writes can be placed in the memory order at any point from the placing of the corresponding load-mark or store-mark on the line to the clearing of that mark, regardless of when they were actually performed by the hardware.

Embodiments of the present invention use load-marks and store-marks to implement transactions by requiring that (1) the processor (or thread) places a load-mark on all lines read in a transaction, (2) the processor (or thread) places a store-mark on all lines written in the transaction, (3) these load-marks and store-marks are all held simultaneously when the transaction commits, (4) all loads that precede the transaction in program order are either committed prior to the transaction commit or have a load-mark on the cache line when the transaction commits, and (5) all stores that precede the transaction in program order are either committed prior to the transaction commit or have a store-mark on the cache line when the transaction commits. These rules guarantee that all reads and writes within the transaction can be placed (in program order) in the memory order when the transaction commits, without any intervening memory accesses from any other processors (or threads), thus preserving transactional semantics. Specifically, when the transaction commits, all earlier (in program order) loads for which load-marks are held are placed in the memory order, then all earlier (in program order) stores for which store-marks are held are placed in the memory order, then all loads and stores within the transaction are placed in the memory order.

Embodiments of the present invention use the same rules to implement atomic instructions (such as read-modify-write) by viewing the load and store portions of the atomic as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware speculative execution is also viewed as a transaction.

Executing a Non-Starvation-Avoiding Transaction

Figure 7:
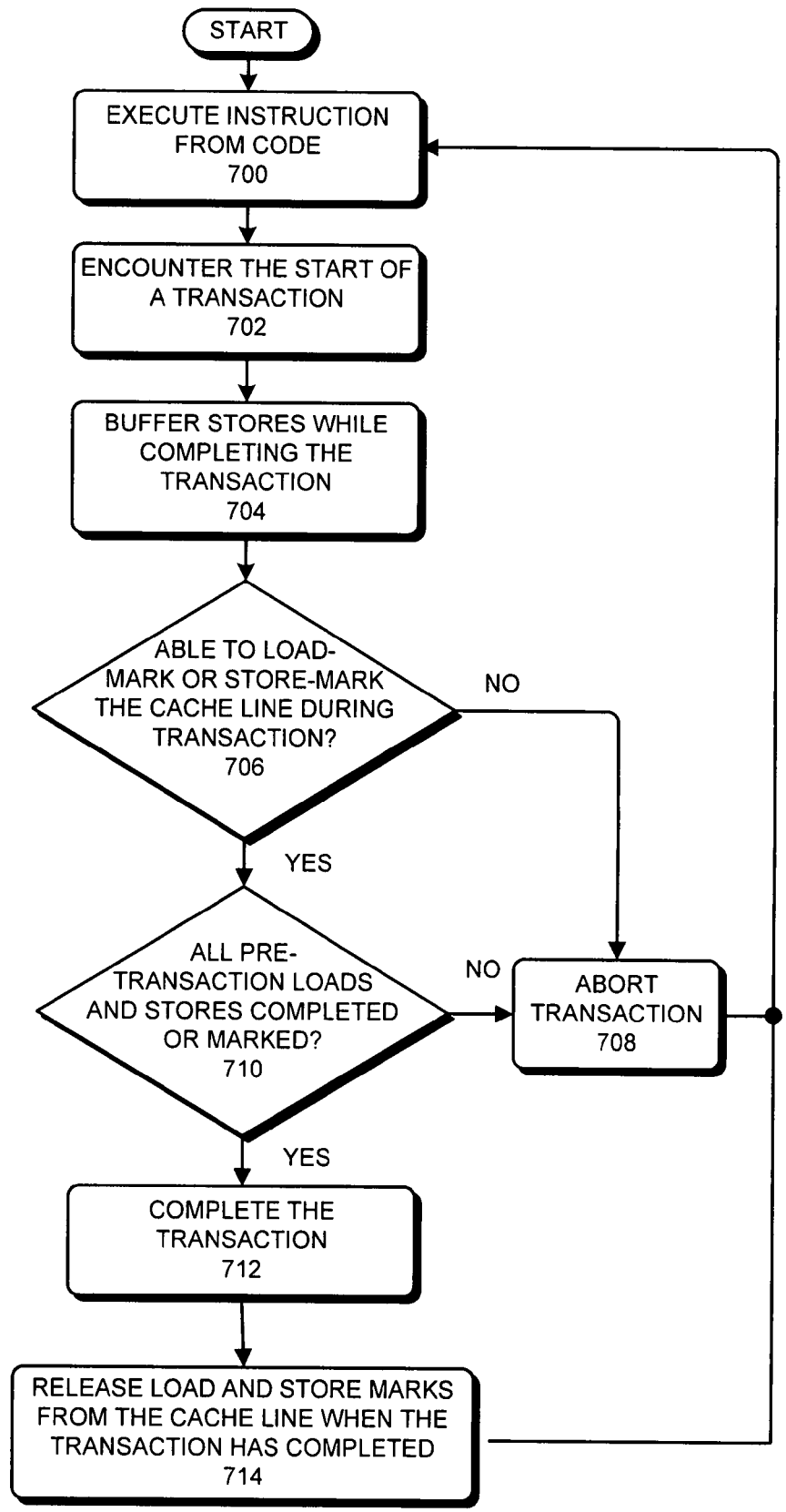
FIG. 7 presents a flow chart illustrating the process of executing a non-starvation-avoiding transaction in accordance with an embodiment of the present invention.

FIG. 7 presents a flow chart illustrating the process of executing a non-starvation-avoiding transaction (alternatively called a "transaction") in accordance with an embodiment of the present invention. The process starts with a thread executing instructions (step 700).

The thread then encounters the start of a transaction (step 702). For example, the transaction can be initiated by a start transactional execution ("STE") instruction, which puts the thread in transactional-execution mode. For a more detailed explanation of starting transactional execution see U.S. patent application Ser. No. 10/637,166, entitled "Start Transactional Execution (STE) Instruction to Support Transactional Program Execution," by inventors Marc Tremblay, Quinn A. Jacobson and Shailender Chaudhry, filed on 8 Aug. 2003, which is hereby incorporated by reference to explain the process of starting transactional execution. Alternatively a transaction can be defined to be an atomic operation, in which case the start of the transaction can be indicated by an atomic instruction, such as a read-modify-write instruction. Furthermore, a transaction can be defined as hardware speculative execution, in which case the start of the transaction can be indicated by the entry to the hardware speculative execution episode.

Upon entering the transaction, the system switches the transaction state indicator to "transaction pending," takes a checkpoint of the architectural state of the strand, and commences buffering of store operations encountered during the transaction (step 704).

During the transaction, the thread attempts to place a load-mark on all cache lines read by the thread and a store-mark on all cache lines written by the thread (step 706). If the thread is unable to place a mark on a cache line, the transaction aborts (step 708). For example, if the transaction attempts to place a store-mark on a cache line that has already been load-marked or store-marked by another thread, the thread is unable to place the store-mark and the transaction aborts and the system restores the architectural state that was checkpointed at the start of the transaction. The system then returns to step 700 and continues to execute instructions from the program code.

Note that in order to protect marked cache lines from subsequent memory operations by other threads during the transaction, all load-marks and store-marks placed on cache lines during the transaction remain on the cache line until the transaction commits. In other words, the marking thread simultaneously holds all the load-marks and store-marks placed during the transaction when the transaction commits.

When the transaction has completed (as indicated by the completion of the atomic instruction, the return to non-speculative execution after a hardware speculative execution episode, or by the commit instruction at the end of transactional execution), the system prepares to commit the results of the transaction. Before committing the results of transactional execution, the system determines whether all loads that precede the transaction in program order have either been committed or have a read mark on a corresponding cache line. The system also determines whether all stores that precede the transaction in program order are either committed to memory prior to the transaction commit or have a write mark on a corresponding cache line (step 710). If not, the transaction aborts (step 708). The system then returns to step 700 and continues to execute instructions from the program code.

Otherwise, because the pre-transaction loads and stores either commit before the transaction or hold a load-mark or store-mark on an associated cache line, all reads and writes within the transaction can be committed when the transaction completes without any intervening memory accesses from any other thread. In this case, the system commits the results of the transaction by completing the stores buffered during the transaction (step 712).

After committing the results of the transaction, the thread releases any load-marks and store-marks from any cache lines that were accessed during the transaction and returns the transaction state indicator to the "not-in-transaction" state (step 714). The system then returns to step 700 and continues to execute instructions from the program code.

Starvation-Avoiding Transactions

Embodiments of the present invention implement starvation-avoiding transactions using cache line marking which is similar to, but different from, the marking described in the preceding sections. For example, unlike non-starvation-avoiding transactions, starvation-avoiding transactions are not invoked due to hardware speculative-execution. In addition, only one starvation avoiding transaction can execute at a time, in order to avoid deadlock between two starvation-avoiding transactions.

When a processor (or thread) wants to begin a starvation-avoiding transaction, the processor requests a special token. The granting of the token can be implemented within special hardware in a globally-accessible memory controller or other system component, or the granting of the token can be implemented in coherent memory which supports atomic accesses. Only one processor (or thread) can be granted the token for executing starvation-avoiding transactions at a time. Each granted token has a timestamp which is incremented each time a new token is granted. Tokens are ideally granted in a fair, starvation-free manner (such as using round-robin arbitration).

When a processor has been granted a token, the processor starts to execute its starvation-avoiding transaction. Before the processor reads or writes any cache line, the processor places a special "starvation-avoiding" load-mark or "starvation-avoiding" store-mark on the cache line and writes the timestamp of the token to metadata on the cache line. The starvation-avoiding load-mark and starvation-avoiding store-mark and the timestamp are stored in metadata that stays with the cache line in all caches and in the memory. For embodiments of the present invention, the metadata is propagated from the cache line to other caches and memory in a similar fashion to the coherence load-mark and store-marks described in the preceding sections of this description. In alternative embodiments, the metadata is propagated from the cache line to other caches and memory in a similar fashion to the coherence load-mark and store-marks described in a pending U.S. patent application entitled "Efficient Marking of Shared Cache Lines," by Robert E. Cypher and Shailender Chaudhry, having Ser. No. 11/635,270, and filing date Dec. 6, 2006 which is hereby incorporated by reference to explain the details of propagating metadata. When the starvation-avoiding load-mark or starvation-avoiding store-mark has been placed on the line, the processor performs its read or write operation on the cache line.

If the processor executing a starvation-avoiding transaction encounters a memory conflict with a processor that is executing another transaction (i.e., a non-starvation-avoiding transaction), either the other transaction is made to fail or the other transaction is allowed to complete and the processor executing the starvation-avoiding transaction is then allowed to proceed. In particular, if the cache line marking protocol described with reference to FIG. 7 is being used for the non-starvation-avoiding transactions, the processor executing the starvation-avoiding transaction can set a special SA-requested flag on the cache line (analogous to the store-requested flag described in a pending U.S. patent application entitled "Preventing Store Starvation in a System that Supports Marked Coherence," by Robert E. Cypher and Shailender Chaudhry, having Ser. No. 11/700,703, and filing date Jan. 30, 2007 )). The SA-requested flag prevents any other processors from setting new load-marks or store-marks on the cache line if the processor executing the starvation-avoiding transaction has placed its mark on the line. When the processor completes the starvation-avoiding transaction, the processor releases the token.

In embodiments of the present invention, a thread can place a starvation-avoiding load-mark on a copy of a cache line held in a local cache in the shared state while another thread has already placed a non-starvation-avoiding load-mark on a copy of that cache line held in a different local cache in the shared state. In these embodiments, the system maintains the reader count and the starvation-avoiding load-mark if one or more of the copies of the cache lines in the local caches are replaced or invalidated.

In alternative embodiments, the system prevents the thread from placing the starvation-avoiding load-mark on a copy of a cache line in the shared state that already has a non-starvation-avoiding load-mark on a copy of that cache line held in a different local cache. In these embodiments, the system performs a copyback-invalidate request before placing a starvation-avoiding load-mark on the cache line. If the reader count value of the returned cache line is positive (i.e., non-zero) the thread either (1) waits and then re-attempts the starvation-avoiding load-marking operation or (2) terminates the non-starvation-avoiding transaction and then proceeds with the starvation-avoiding load-marking operation.

Whenever a processor that is not executing a transaction or is executing a non-starvation-avoiding transaction wants to read (or write) a cache line, the processor first checks if there is a starvation-avoiding write (or read or write) mark on the line. If no such mark is found, the processor can read or write the line as allowed by the underlying cache-coherence protocol. If such a mark is found, the processor checks if there is a currently-active starvation-avoiding transaction, and if there is one, determines what timestamp is being used by the starvation-avoiding transaction. Only if there is a currently executing starvation-avoiding transaction, and if that transaction is associated with the same timestamp as the cache line being accessed, does the processor have to wait and try again later. If the processor does have to wait and if the processor holds resources that could prevent the starvation-avoiding transaction from completing, the processor should free those resources within bounded time. Specifically, if the processor is using the cache line marking protocol described with respect to FIG. 7 and if the processor is executing a non-starvation-avoiding transaction, the processor should abort that transaction and clear the load- and store-marks that the processor has set within bounded time.

Note that starvation-avoiding transactions are non-speculative. In other words, the starvation-avoiding transaction is guaranteed to complete. Consequently, the results of starvation-avoiding transactions can be committed to the architectural state of the processor as the underlying operation is completed.

In addition, during a starvation-avoiding transaction, the processor (or thread) can perform IO accesses. IO accesses can include "noncacheable accesses," and other types of accesses that have side-effects (e.g., a noncacheable load can affect the state of some device, and a noncacheable store can affect the state of a device that is greater than the setting of the particular target of the store to the value specified by the store). IO accesses can be accesses to peripherals, but they can also be to configuration, status, or error reporting registers on a processor or ASIC. For example, in order to set up a DMA operation from an IO card, one may perform a sequence of noncacheable stores to registers on the IO card that specify the address and size of the DMA operation. These operations are typically "memory mapped" in that they use normal load and store instructions but they access locations that cannot be cached and that can have side-effects.

Executing a Starvation-Avoiding Transaction

Figure 8:
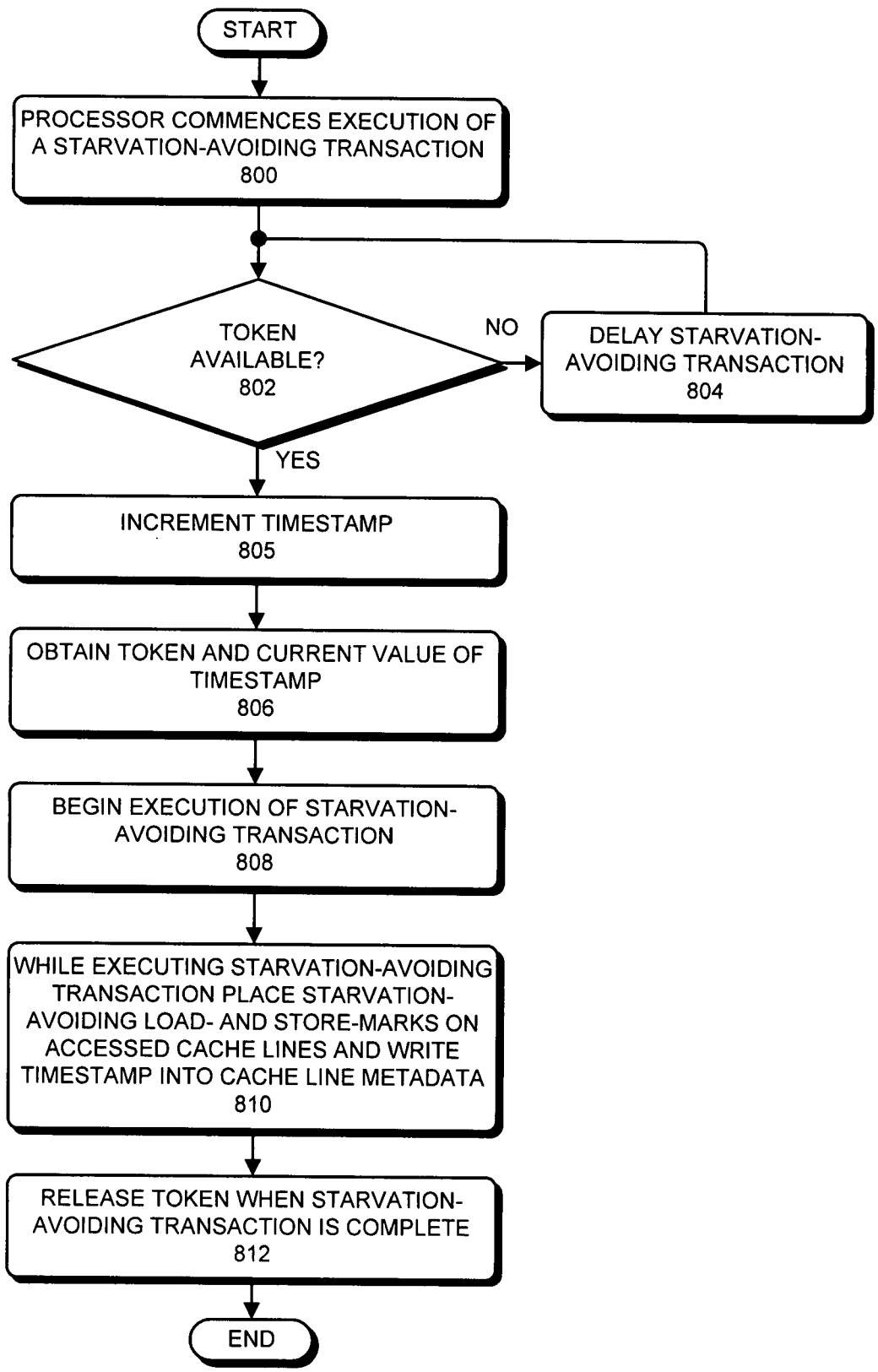
FIG. 8 presents a flowchart illustrating the process of executing a starvation-avoiding transaction in accordance with an embodiment of the present invention.

FIG. 8 presents a flowchart illustrating the process of executing a starvation-avoiding transaction in accordance with an embodiment of the present invention. The process starts when a processor (or thread) commences execution of a starvation-avoiding transaction (step 800).

The processor first requests the token from token controller 112 (step 802). If the token is held by another processor that is executing a starvation-avoiding transaction, the processor cannot obtain the token. In this case, the processor delays the execution of the starvation-avoiding transaction (step 804).

Otherwise, the system increments the value of the timestamp (step 805) and the processor obtains the token and the current value of the timestamp (step 806). The processor then commences the execution of the starvation-avoiding transaction (step 808). As the processor executes the starvation-avoiding transaction, the processor marks each cache line that is read from or written to with a starvation-avoiding load-mark or a starvation-avoiding store-mark. While placing the starvation-avoiding load-mark or store-mark on the cache line, the processor writes the value of the timestamp to metadata for the cache line (step 810). When set, the starvation-avoiding mark and the timestamp are propagated along with copies of the cache line to other caches and memory.

Note that writing the timestamp to the metadata for the cache line facilitates executing "unbounded" transactions. This is because starvation-avoiding transactions are not limited by the size of the private buffer (as are non-starvation-avoiding transactions) because each starvation-avoiding load- or store-marked cache line is identifiable by the timestamp in the cache line's metadata. Hence, the processor is not required to maintain a record of each marked cache line in the private buffer during a starvation-avoiding transaction.

When the processor completes the starvation-avoiding transaction, the processor releases the token back to token controller 112 (step 812). In embodiments of the present invention, the processor does not clear the starvation-avoiding load-marks/starvation-avoiding store-marks and the timestamp from the marked cache lines when the starvation-avoiding transaction is completed. Rather, the starvation-avoiding load-marks/starvation-avoiding store-marks and the timestamp can be cleared or overwritten by the next processor (or thread) that loads, stores, load-marks, store-marks, starvation-avoiding load-marks, or starvation-avoiding store-marks the cache line.

Figure 9:
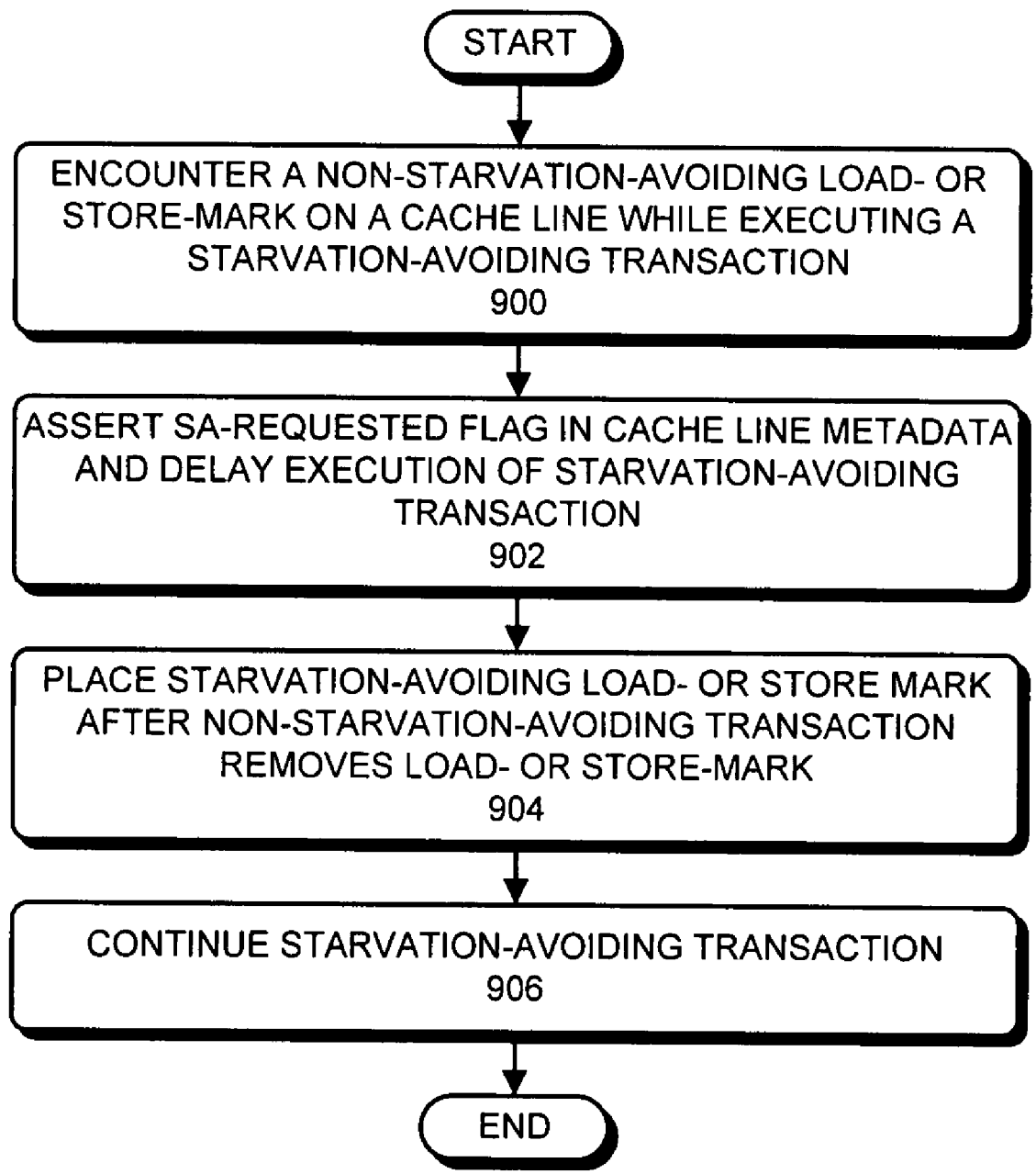
FIG. 9 presents a flowchart illustrating a process for handling a memory conflict between a processor that is executing a starvation-avoiding transaction and a processor that is executing a non-starvation-avoiding transaction in accordance with an embodiment of the present invention.

Conflicts Between Starvation-Avoiding Transactions and Non-Starvation-Avoiding Transactions FIG. 9 presents a flowchart illustrating a process for handling a memory conflict between a processor that is executing a starvation-avoiding transaction and a processor that is executing a non-starvation-avoiding transaction in accordance with an embodiment of the present invention. The process starts when a processor (or thread) that is executing a starvation-avoiding transaction encounters a memory conflict with a processor (or thread) that is executing a non-starvation-avoiding transaction (step 900). The memory conflict occurs when the processor that is executing the starvation-avoiding transaction encounters a load- or store-mark placed on a cache line by the processor that is executing the non-starvation-avoiding transaction.

In one embodiment of the present invention, the marking processor continues to execute the non-starvation-avoiding transaction, while the processor that is executing the starvation-avoiding transaction sets the SA-requested flag in the cache line's metadata and delays the execution of the starvation-avoiding transaction (step 902). When the SA-requested flag is set on the cache line, no other threads can place a load- or store-mark to the cache line. Hence, when the marking processor completes the load or store operation and removes the load- or store-mark, the processor executing the starvation-avoiding transaction places a starvation-avoiding load- or store-mark (step 904) and continues the starvation-avoiding transaction (step 906).

Note that in an alternative embodiment, the non-starvation-executing processor aborts the execution of the transaction when a conflict occurs with a starvation-avoiding transaction, including removing the corresponding load- and store-marks from the cache line. In this embodiment, after the non-starvation-avoiding transaction removes its load- and store-marks, the processor executing the starvation-avoiding transaction continues to execute the starvation-avoiding transaction.

Figure 10:
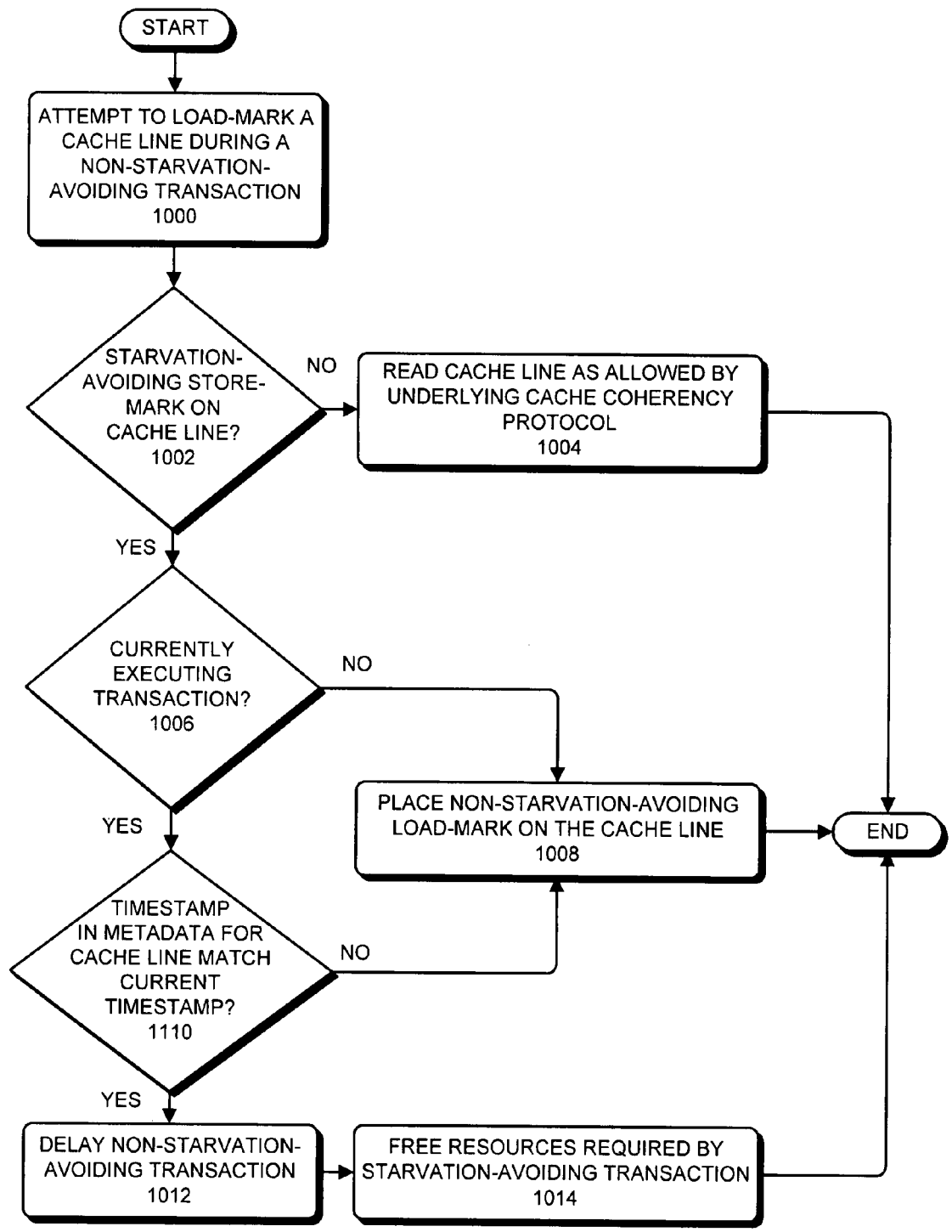
FIG. 10 presents a flowchart illustrating the process for handling a memory conflict between a processor that is executing a non-starvation-avoiding transaction and a processor that is executing a starvation-avoiding transaction in accordance with an embodiment of the present invention.

FIG. 10 presents a flowchart illustrating the process for handling a memory conflict between a processor that is executing a non-starvation-avoiding transaction and a processor that is executing a starvation-avoiding transaction in accordance with an embodiment of the present invention. The process starts with a processor (or thread) that is executing a non-starvation-avoiding transaction attempts to load-mark a cache line (step 1000). Note that a load-mark is used for purposes of illustration, but store-marks can be handled in a similar fashion.

The processor determines if there is a starvation-avoiding store-mark on the cache line (step 1002). If not, the processor can read the cache line as allowed by the underlying cache coherency protocol (step 1004).

On the other hand, if there is a starvation-avoiding store-mark on the cache line, the processor determines if there is a processor (or thread) that is currently executing a starvation-avoiding transaction (step 1006). If not, the starvation-avoiding store-mark is stale and the processor places the non-starvation-avoiding load-mark on the cache line (step 1008). In one embodiment of the present invention, the processor also removes the starvation-avoiding store-mark from the cache line, including removing the timestamp associated with the starvation-avoiding store-mark.

If there is a processor that is executing a starvation-avoiding transaction, the processor determines if the timestamp in the metadata for the marked cache line matches the current timestamp (step 1010). In one embodiment of the present invention, each processor keeps a current copy of the timestamp for performing this comparison. In an alternative embodiment, the value for the current timestamp is kept in token controller 112 and each processor reads the timestamp before performing a comparison. If the timestamp does not match the current timestamp, the starvation-avoiding store-mark is stale and the processor places the non-starvation-avoiding load-mark on the cache line (step 1008). In one embodiment of the present invention, the processor also removes the starvation-avoiding store-mark from the cache line, including removing the timestamp associated with the starvation-avoiding store-mark.

Otherwise, the store-mark on the cache line was placed by the processor that is currently executing a starvation-avoiding transaction. In this case, the processor delays the non-starvation-avoiding transaction (step 1012) and frees any resources that are required by the starvation-avoiding transaction (step 1014).

Figure 11:
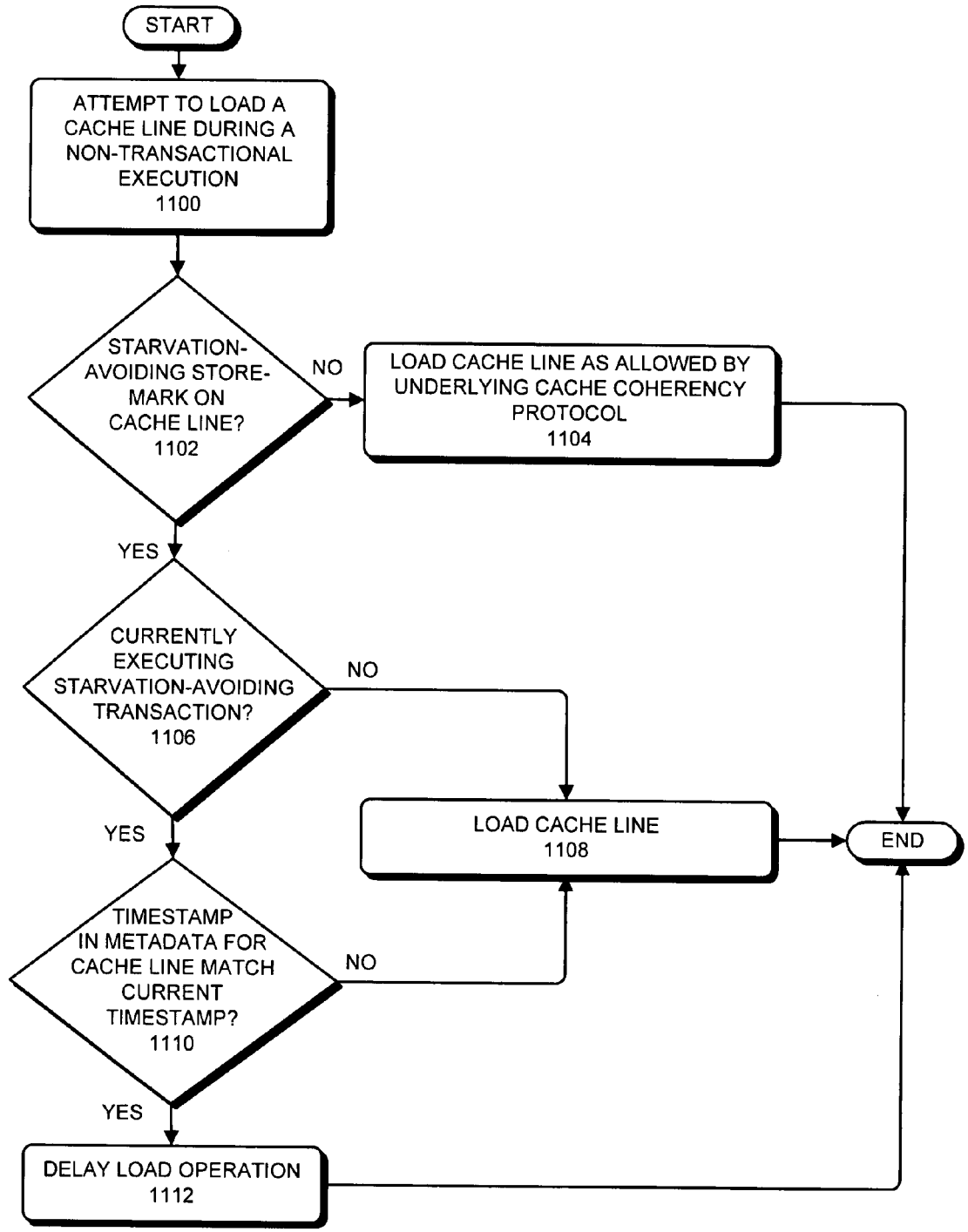
FIG. 11 presents a flowchart illustrating the process for handling a memory conflict between a processor that is executing non-transactionally and a processor that is executing a starvation-avoiding transaction in accordance with an embodiment of the present invention.

FIG. 11 presents a flowchart illustrating the process for handling a memory conflict between a processor that is executing non-transactionally and a processor that is executing a starvation-avoiding transaction in accordance with an embodiment of the present invention. The process starts when a processor (or thread) attempts to load a cache line during non-transactional execution (step 1100). Note that loading the cache line is used for the purposes of illustration, but storing to the cache line can be handled in a similar fashion.

The processor determines if there is a starvation-avoiding store-mark on the cache line (step 1102). If not, the processor can load the cache line as allowed by the underlying cache coherency protocol (step 1104).

On the other hand, if there is a starvation-avoiding store-mark on the cache line, the processor determines if there is a processor (or thread) that is currently executing a starvation-avoiding transaction (step 1106). If not, the starvation-avoiding store-mark is stale and the processor loads the cache line (step 1108). In one embodiment of the present invention, the processor also removes the starvation-avoiding store-mark from the cache line, including removing the timestamp associated with the starvation-avoiding store-mark.

If there is a processor that is executing a starvation-avoiding transaction, the processor determines if the timestamp in the metadata for the marked cache line matches the current timestamp (step 1110). In one embodiment of the present invention, each processor keeps a current copy of the timestamp for performing this determination. In an alternative embodiment, the value for the current timestamp is kept in token controller 112 and each processor reads the timestamp before performing the determination. If the timestamp does not match the current timestamp, the starvation-avoiding store-mark is stale and the processor loads the cache line (step 1108). In one embodiment of the present invention, the processor also removes the starvation-avoiding store-mark from the cache line, including removing the timestamp associated with the starvation-avoiding store-mark.

Otherwise, the store-mark on the cache line was placed by the processor that is currently executing a starvation-avoiding transaction. In this case, the processor delays the load operation (step 1112).

Time Stamp Wrap-Around

Note that for embodiments of the present invention, if the timestamp being used for starvation-avoiding transactions wraps around, there is a potential (small) performance penalty, but correctness is not sacrificed. In particular, if a processor that is not executing a starvation-avoiding transaction detects a false conflict because of a timestamp wraparound, the processor only has to wait until the processor currently executing a starvation-avoiding transaction completes its transaction. Also, note that if the processor that is executing a starvation-avoiding transaction accesses a cache line that has a wrapped-around timestamp, the processor continues without delay as it appears that the processor has already marked the line (and there is no correctness problem with its concluding that the processor has already marked the line, because all other processors also treat the line as though the line has already been marked by the processor currently executing the starvation-avoiding transaction). Finally, note that the frequency of false conflicts due to wraparounds can be reduced by clearing the starvation-avoiding marks whenever a cache line is accessed that has such marks and a "not-current" timestamp.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating efficient transactional execution, comprising:
    executing a starvation-avoiding transaction for a thread, and at least one non-starvation-avoiding transaction for another thread;
    wherein executing each of the starvation-avoiding transaction and the non-starvation-avoiding transaction involves placing load-marks on cache lines which are loaded during the corresponding transaction, and placing store-marks on cache lines which are stored to during the corresponding transaction;
    wherein executing the starvation-avoiding transaction involves writing a timestamp value into metadata for load-marked and store-marked cache lines; and
    wherein executing the non-starvation-avoiding transaction involves storing the addresses of load-marked or store-marked cache lines in a private buffer for the other thread;
    preventing other threads from executing other starvation-avoiding transactions while the thread is executing the starvation-avoiding transaction; and
    if a load-mark or store-mark placed during a non-starvation-avoiding transaction is encountered on a cache line read from or written to during the starvation-avoiding transaction, aborting the non-starvation-avoiding transaction, wherein aborting the non-starvation-avoiding transaction involves using the addresses stored in the private buffer to identify cache lines load-marked or store-marked during the non-starvation-avoiding transaction.

2. The method of claim 1, wherein the method further comprises obtaining a token before commencing execution of the starvation-avoiding transaction and releasing the token when the starvation-avoiding transaction completes.

3. The method of claim 1, wherein when a cache line is load-marked, no other thread may store a value in the cache line and when a cache line is store-marked, no other thread may load or store a value in the cache line.

4. The method of claim 3, further comprising:
    storing the addresses of load-marked or store-marked cache lines in a private buffer corresponding to the other thread.

5. The method of claim 4, wherein if a load-mark or store-mark placed during a non-starvation-avoiding transaction is encountered on a cache line read from or written to during the starvation-avoiding transaction, the method further comprises:
    releasing the load-marks and store-marks from the identified cache lines;
    placing a load-mark or store-mark associated with the starvation-avoiding transaction on the cache line and writing a timestamp value into metadata for the cache line; and
    continuing the starvation-avoiding transaction.

6. The method of claim 4, wherein the method further comprises, if a load-mark or store-mark placed during a non-starvation-avoiding transaction is encountered on a cache line read from or written to during the starvation-avoiding transaction:
    setting a starvation-avoiding transaction requested (SA-requested) flag for the cache line, wherein when the SA-requested flag is set, no other thread can place a subsequent load-mark or store-mark on the cache line;
    delaying the starvation-avoiding transaction; and
    continuing the starvation-avoiding transaction when the marking thread has cleared the load-mark or store-mark from the cache line, wherein continuing the starvation-avoiding transaction involves clearing the SA-requested flag, placing a load-mark or a store-mark on the cache line, and writing the timestamp value into metadata for the cache line.

7. The method of claim 1, wherein the method further comprises performing IO accesses during the starvation-avoiding transaction as corresponding IO access instructions are executed.

8. An apparatus for facilitating efficient transactional execution, comprising:
    a processor;
    an execution mechanism on the processor;
    wherein the execution mechanism is configured to execute a starvation-avoiding transaction for a thread, and at least one non-starvation-avoiding transaction for another thread;
    wherein executing each of the starvation-avoiding transaction and the non-starvation-avoiding transaction involves placing load-marks on cache lines which are loaded during the corresponding transaction, and placing store-marks on cache lines which are stored to during the corresponding transaction;
    wherein executing the starvation-avoiding transaction involves writing a timestamp value into metadata for load-marked and store-marked cache lines; and
    wherein executing the non-starvation-avoiding transaction involves storing the addresses of load-marked or store-marked cache lines in a private buffer for the other thread;
    wherein while executing the starvation-avoiding transaction, the execution mechanism is configured to prevent other threads from executing starvation-avoiding transactions; and
    wherein if the execution mechanism encounters a load-mark or store-mark placed during a non-starvation-avoiding transaction on a cache line read from or written to during the starvation-avoiding transaction, the execution mechanism is configured to abort the non-starvation-avoiding transaction, wherein aborting the non-starvation-avoiding transaction involves using the addresses stored in the private buffer to identify cache lines load-marked or store-marked during the non-starvation-avoiding transaction.

9. The apparatus of claim 8, wherein the execution mechanism is configured to obtain a token before commencing execution of the starvation-avoiding transaction and release the token when the starvation-avoiding transaction completes.

10. The apparatus of claim 8, wherein when a cache line is load-marked, no other thread may store a value in the cache line and when a cache line is store-marked, no other thread may load or store a value in the cache line.

11. The apparatus of claim 10, wherein the execution mechanism is further configured to:
    store the addresses of load-marked or store-marked cache lines in a private buffer corresponding to the other thread.

12. The apparatus of claim 11, wherein if the execution mechanism encounters a load-mark or store-mark placed during a non-starvation-avoiding transaction on a cache line read from or written to during the starvation-avoiding transaction, the execution mechanism is configured to:
    to release the load-marks and store-marks from the identified cache lines;

place a load-mark or store-mark associated with the starvation-avoiding transaction on the cache line and write a timestamp value into metadata for the cache line; and to continue the starvation-avoiding transaction.

13. The apparatus of claim 11, wherein if the execution mechanism encounters a load-mark or store-mark placed during a non-starvation-avoiding transaction on a cache line read from or written to during the starvation-avoiding transaction, the execution mechanism is configured to:
  set a starvation-avoiding transaction requested (SA-requested) flag for the cache line, wherein when the SA-requested flag is set, no other thread can place a subsequent load-mark or store-mark on the cache line;
  delay the starvation-avoiding transaction; and to
  continue the starvation-avoiding transaction when the marking thread has cleared the load-mark or store-mark from the cache line, wherein continuing the starvation-avoiding transaction involves clearing the SA-requested flag, placing a load-mark or a store-mark on the cache line, and writing the timestamp value into metadata for the cache line.

14. The apparatus of claim 8, wherein the execution mechanism is configured to perform IO accesses during the starvation-avoiding transaction as corresponding IO access instructions are executed.

15. A computer system for facilitating efficient transactional execution, comprising:
  a processor;
  a memory coupled to the processor, wherein the memory is configured to store data and instructions for the processor;
  an execution mechanism on the processor;
  wherein the execution mechanism is configured to execute a starvation-avoiding transaction for a thread, and at least one non-starvation-avoiding transaction for another thread;
  wherein executing each of the starvation-avoiding transaction and the non-starvation-avoiding transaction involves placing load-marks on cache lines which are loaded during the corresponding transaction, and placing store-marks on cache lines which are stored to during the corresponding transaction;
  wherein executing the starvation-avoiding transaction involves writing a timestamp value into metadata for load-marked and store-marked cache lines; and
  wherein executing the non-starvation-avoiding transaction involves storing the addresses of load-marked or store-marked cache lines in a private buffer for the other thread;
  wherein while executing the starvation-avoiding transaction, the execution mechanism is configured to prevent other threads from executing starvation-avoiding transactions; and
  wherein if the execution mechanism encounters a load-mark or store-mark placed during a non-starvation-avoiding transaction on a cache line read from or written to during the starvation-avoiding transaction, the execution mechanism is configured to abort the non-starvation-avoiding transaction, wherein aborting the non-starvation-avoiding transaction involves using the addresses stored in the private buffer to identify cache lines load-marked or store-marked during the non-starvation-avoiding transaction.

16. The computer system of claim 15, wherein the execution mechanism is configured to obtain a token before commencing execution of the starvation-avoiding transaction and release the token when the starvation-avoiding transaction completes.

17. The computer system of claim 15, wherein when a cache line is load-marked, no other thread may store a value in the cache line and when a cache line is store-marked, no other thread may load or store a value in the cache line.

18. The computer system of claim 17, wherein the execution mechanism is further configured to:
  store the addresses of load-marked or store-marked cache lines in a private buffer corresponding to the other thread.

19. The computer system of claim 18, wherein if the execution mechanism encounters a load-mark or store-mark placed during a non-starvation-avoiding transaction on a cache line read from or written to during the starvation-avoiding transaction, the execution mechanism is configured to:
  release the load-marks and store-marks from the identified cache lines;
  place a load-mark or store-mark associated with the starvation-avoiding transaction on the cache line and write a timestamp value into metadata for the cache line; and to
  continue the starvation-avoiding transaction.

20. The computer system of claim 18, wherein if the execution mechanism encounters a load-mark or store-mark placed during a non-starvation-avoiding transaction on a cache line read from or written to during the starvation-avoiding transaction, the execution mechanism is configured to:
  set a starvation-avoiding transaction requested (SA-requested) flag for the cache line, wherein when the SA-requested flag is set, no other thread can place a subsequent load-mark or store-mark on the cache line;
  delay the starvation-avoiding transaction; and to
  continue the starvation-avoiding transaction when the marking thread has cleared the load-mark or store-mark from the cache line, wherein continuing the starvation-avoiding transaction involves clearing the SA-requested flag, placing a load-mark or a store-mark on the cache line, and writing the timestamp value into metadata for the cache line.

21. The computer system of claim 15, wherein the execution mechanism is configured to perform IO accesses during the starvation-avoiding transaction as corresponding IO access instructions are executed.

* * * * *

UNITED STATES PATENT AND TRADEMARK OFFICE
CERTIFICATE OF CORRECTION

PATENT NO. : 7,730,265 B1  Page 1 of 1
APPLICATION NO. : 11/715243
DATED : June 1, 2010
INVENTOR(S) : Robert E. Cypher et al.

It is certified that error appears in the above-identified patent and that said Letters Patent is hereby corrected as shown below:

In claim 12 (at column 20, line 66), please delete the word "to" at the beginning of the line so the line reads: "release the load-marks and store-marks from the identi-".

Signed and Sealed this

Twenty-seventh Day of July, 2010

David J. Kappos
*Director of the United States Patent and Trademark Office*